US012756113B2

(12) United States Patent
Jaffri

(10) Patent No.: US 12,756,113 B2
(45) Date of Patent: Oct. 6, 2026

(54) MULTI-ANTENNA ASSEMBLY FOR COMPACT ELECTRONIC DEVICES

(71) Applicant: ZEBRA TECHNOLOGIES CORPORATION, Lincolnshire, IL (US)

(72) Inventor: Rehan K. Jaffri, Tarrytown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 79 days.

(21) Appl. No.: 17/989,649

(22) Filed: Nov. 17, 2022

(65) Prior Publication Data

US 2024/0170857 A1 May 23, 2024

(51) Int. Cl.
*H01Q 21/24* (2006.01)
*H01Q 9/16* (2006.01)
*H01Q 13/10* (2006.01)

(52) U.S. Cl.
CPC ............... *H01Q 21/24* (2013.01); *H01Q 9/16* (2013.01); *H01Q 13/10* (2013.01)

(58) Field of Classification Search
CPC .......... H01Q 21/24; H01Q 9/16; H01Q 13/10; H01Q 21/28
See application file for complete search history.

(56) References Cited

U.S. PATENT DOCUMENTS

| | | | | |
|---|---|---|---|---|
| 9,941,598 B2 * | 4/2018 | Suh | H04B 1/54 | |
| 2010/0188306 A1 * | 7/2010 | Kitayoshi | H01Q 1/085 | 343/767 |
| 2014/0327588 A1 * | 11/2014 | Tran et al. | H01Q 21/24 | 343/727 |

FOREIGN PATENT DOCUMENTS

| | | | |
|---|---|---|---|
| WO | WO2022/228872 | * 11/2022 | E06B 3/263 |

* cited by examiner

*Primary Examiner* — Graham P Smith

(57) ABSTRACT

A device is comprised of: a first antenna, having a first polarization, operating at a first frequency, and located along a first length from a first end to a second end; and a second antenna, having a second polarization, operating at a second frequency, and located along a second length from a third end to a fourth end, wherein the first polarization is orthogonal to the second polarization, the first antenna is close to the second antenna along the first length and the second length, the first frequency of the first antenna and the second frequency of the second antenna are within the same frequency band, and the first antenna and the second antenna are parallel along the first length and the second length.

9 Claims, 13 Drawing Sheets

MULTI-ANTENNA ASSEMBLY FOR COMPACT ELECTRONIC DEVICES

BACKGROUND

Multiple antenna assemblies in a compact device pose a number of difficulties, such as achieving antenna isolation sufficient enough to maintain radio functionality while maintaining a compact design. This proves especially difficult when the antennas within the assembly operate in the same frequency band, as closely spaced antennas can result in issues such as receiver degradation, noise coupling, and reduced efficiency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
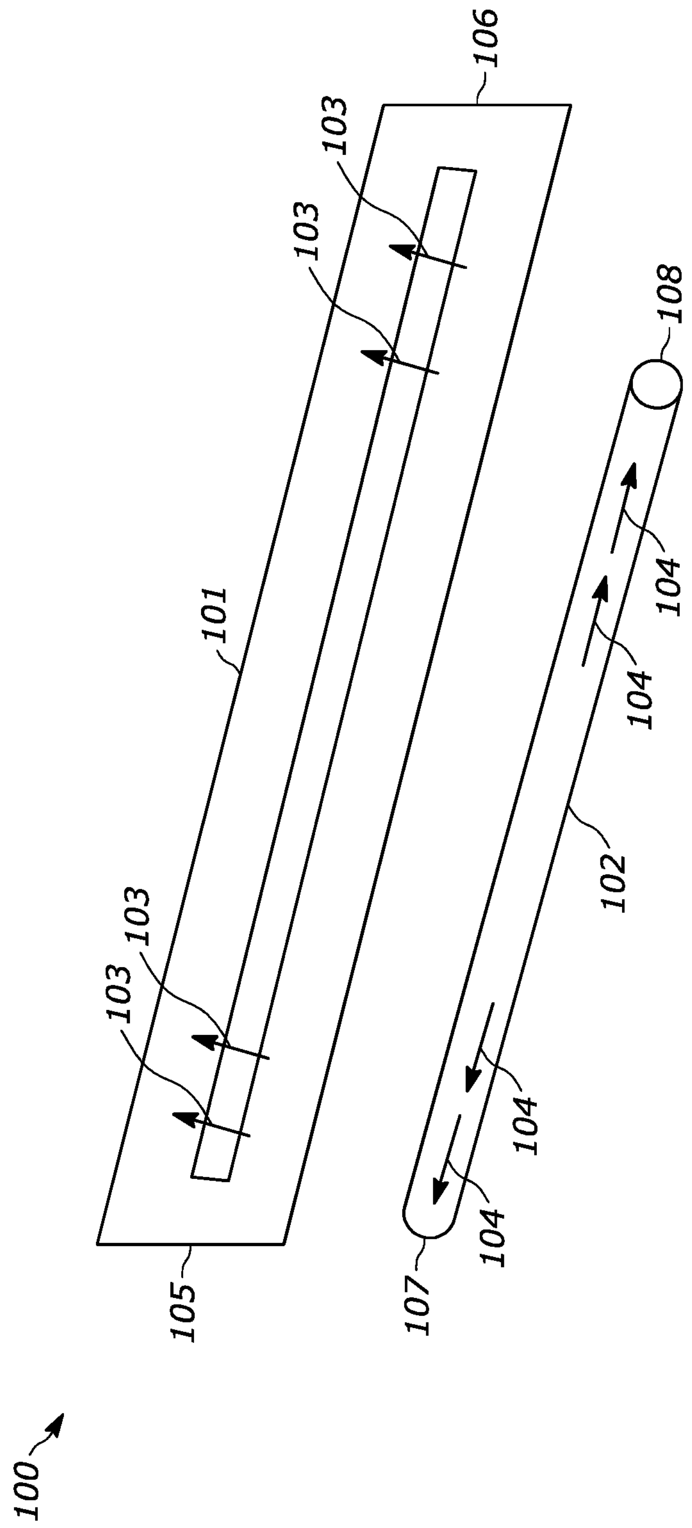
FIG. 1 is a diagram of an example embodiment of the device of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

When two antennas are positioned close to one another, the antennas may couple together resulting in lower isolation between them. Once the antenna isolation, represented by the S-parameter $S_{12}$ (see, FIGS. 6 and 7, ref. $S_{12}$), crosses a certain threshold, one antenna will interfere with the operation of the other resulting in multiple issues such as receiver degradation, reduced efficiency, and noise coupling. Increasing the spacing of the antennas improves the antenna isolation and performance, however, this increases the amount of physical space the antenna arrangement must occupy. In many applications, this space is not available, such as in handheld, compact electronic devices, for example a handheld RFID reader. A device comprised of two antennas, closely spaced to afford a compact form, achieving high antenna isolation and, additionally, achieving high directional gain, is provided.

Examples disclosed herein are directed to a device, such as for use in a radio frequency identification (RFID) device, comprising: a first antenna, having a first polarization, operating at a first frequency, and located along a first length from a first end to a second end; and a second antenna, having a second polarization, operating at a second frequency, and located along a second length from a third end to a fourth end, wherein the first polarization is orthogonal to the second polarization, the first antenna is close to the second antenna along the first length and the second length, the first frequency of the first antenna and the second frequency of the second antenna are within the same frequency band, and the first antenna and the second antenna are substantially parallel along the first length and the second length.

FIG. 1 illustrates an embodiment of the present disclosure. The device 100 includes a first antenna 101 having a first polarization 103 located along a first length from a first end 105 to a second end 106. The device 100 includes a second antenna 102 having a second polarization 104 located along a second length from a third end 107 to a fourth end 108.

The first antenna 101 operates at a first frequency, and the second antenna 102 operates at a second frequency. In one embodiment of the present disclosure, the first frequency and the second frequency are the same frequency. In other embodiments, the first frequency and second frequency are equal to near the same value, such that they are both within the same frequency band (ITU, IEEE, etc.). For example, in one embodiment of the present disclosure, the first frequency and second frequency are both within the Ultra High Frequency Band. In another embodiment, the first frequency and second frequency are within a narrower range of frequencies, such as from 800 MHz to 1 GHz.

The first antenna 101 along the first length is positioned close to the second antenna 102 along the second length. In some embodiments, the distance between the first antenna 101 along the first length and the second antenna 102 along the second length can be relatively close, such as only one-tenth of a wavelength from each other, relative to either the first or second frequency. In other embodiments, the distance between the first antenna 101 along the first length and the second antenna 102 along the second length can be for example, one-half of a wavelength from each other, relative to either the first or second frequency.

Figure 2:
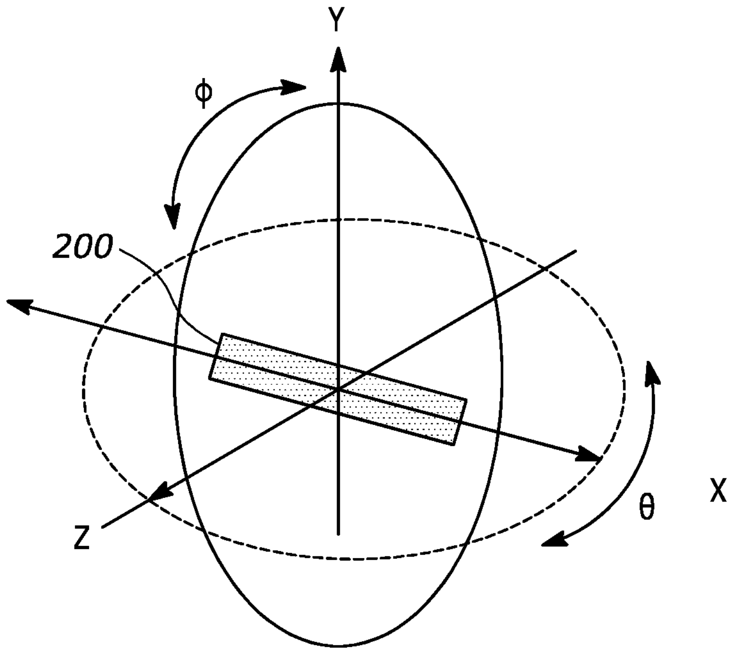
FIG. 2 is a diagram illustrating a coordinate system for understanding the arrangement of example embodiments of the device of the present disclosure.

Herein, descriptions of the positioning of the first antenna 101 and the second antenna 102 relative to each other are made with reference to the, x-, y-, and z-axes and the rotational directions of θ and Φ defined in FIG. 2. For dipole 200 sitting along the x-axis, rotation in the θ direction can be expressed as rotation around the dipole's 200 y-axis, and rotation in the Φ direction can be expressed as rotation around the dipole's z-axis.

Figure 3A:
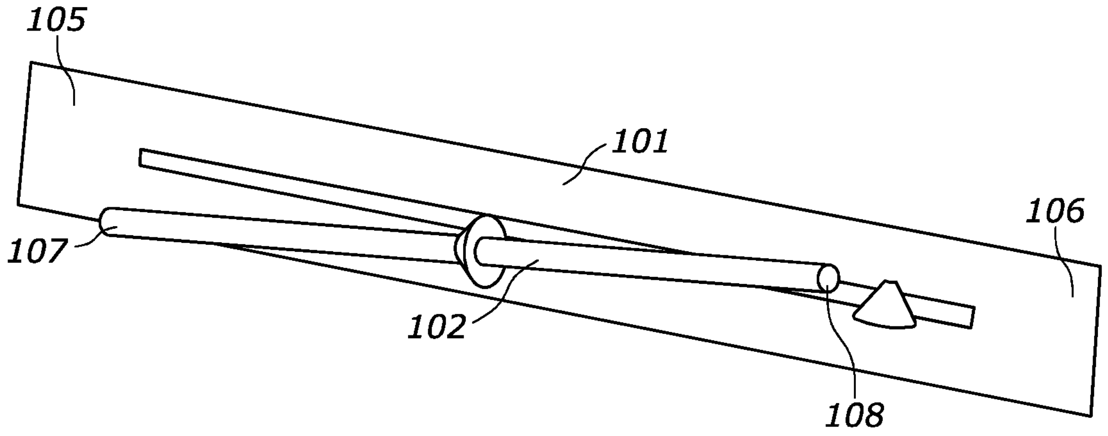
FIGS. 3*a* and 3*b* are diagrams of an example embodiment of the device of the present disclosure, wherein the first antenna and second antenna are askew.
Figure 3B:
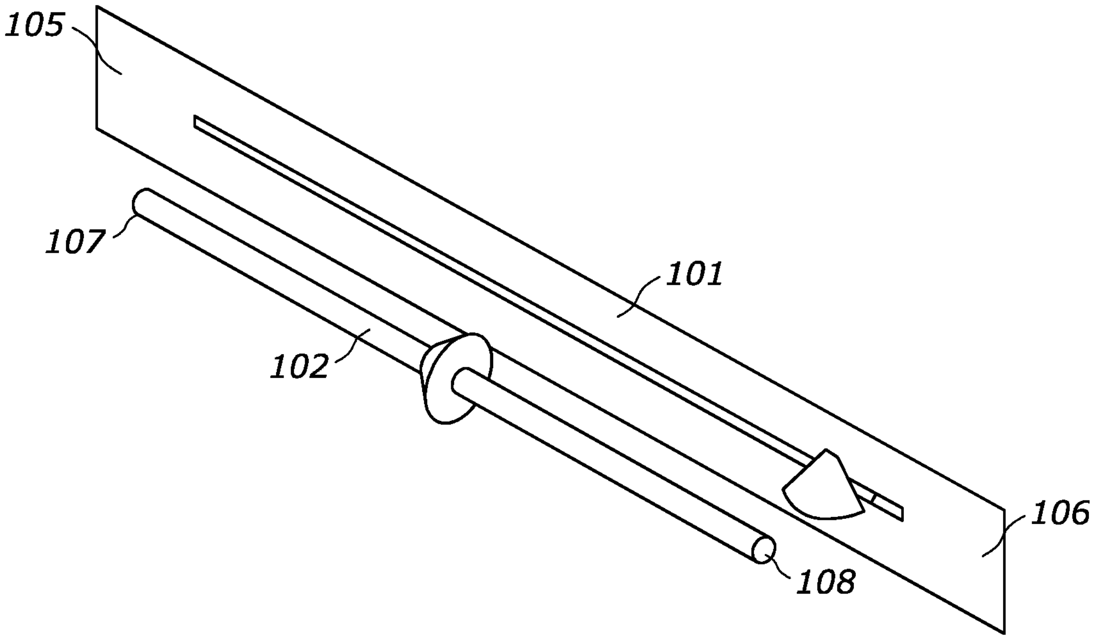

The first antenna 101 and second antenna 102 are parallel along the first and second length. The first antenna 101 and the second antenna 102 do not have to be parallel, but the advantages of the present disclosure are greatest when the antennas 101, 102 are substantially parallel. As illustrated in FIGS. 3*a* and 3*b*, in an embodiment of the present disclosure, the first antenna 101 and second antenna 102 are askew of each other along the first length and second length within 5 degrees. Put in other words, the first antenna 101 or the second antenna 102 may be rotated about its z-axis up to 5 degrees in either direction along its x-axis, or both antennas maybe rotated such that the cumulative amount of rotation is less than or equal to 5 degrees.

Additionally, in embodiments of the present disclosure, the position of first antenna 101 or the second antenna 102 or the positions of both are shifted along the x-axis, y-axis, z-¬axis, or any combination of shifts along any numbers of these axes of the first antenna 101 or the second antenna 102 or both.

In embodiments of the present disclosure, the positions of the first end 105 of the first antenna 101, the second end 106 of the first antenna 101, the third end 107 of the second antenna 102, the fourth end 108 of the second antenna 102, or any combination of the ends 105, 106, 107, 108 are shifted along the x-axis, y-axis, z-axis, or any combination of shifts along any numbers of these axes of the first antenna 101 or the second antenna 102 or both.

In embodiments of the present disclosure, the first antenna 101, the second antenna 102, or both are rotated in the θ direction, the Φ direction, or a combination of the two. Additionally, in embodiments of the present disclosure, the first antenna 101, the second antenna, and the antennas' respective ends 105, 106, 107, 108 undergo a combination of any of the aforementioned positional shifts or rotations.

In another embodiment of the present disclosure, the first antenna 101 and second antenna 102 are coplanar. The first antenna 101 and the second antenna 102 do not have to be coplanar, but the advantages of the present disclosure are greatest when the antennas 101, 102 are substantially coplanar.

In another embodiment of the present disclosure, the first frequency and second frequency are the same. The first frequency and second frequency do not have to be equal, but the advantages of the present disclosure are greatest when the first frequency and second frequency are equal.

In another embodiment of the present disclosure, the first antenna 101, the second antenna 102, or both are shifted along their respective x-axes. The first antenna 101 and the second antenna 102, or both do not have to undergo positional shifts, and the advantages of the present disclosure are greatest when the antennas 101, 102 are centered along their respective x-axes.

In another embodiment of the present disclosure, the first antenna 101 and second antenna 102 are of equal length. The first antenna 101 and the second antenna 102 do not have to be equal in length, but the advantages of the present disclosure are greatest when the antennas 101, 102 are equal in length.

The first polarization 103 of the first antenna 101 is orthogonal the second polarization of the second antenna 102. In the embodiment illustrated in FIG. 1, the first antenna 101 is a slot antenna with a vertical first polarization 103, represented by the arrows running from the bottom to the top of the cavity (slot) of the first antenna 101. The second antenna 102 is a dipole antenna with a horizontal second polarization 104, represented by the arrows running along the length of the dipole. The location of the first antenna 101 relative to the second antenna 102 results in closely coupled antennas; however, as the antennas have different polarizations that are orthogonal, the antennas maintain an antenna isolation acceptable for radio functionality. Slot antennas, such as the first antenna 101, and dipole antennas, such as the second antenna 102, have inverse fields of each other, that is, the electric field pattern that forms around a dipole operating at its resonant frequency is similar to the magnetic field pattern that forms around a slot antenna operating at its resonant frequency. This results in antenna isolation that is comparable to two antennas with the same polarization that are wavelengths apart, meaning that both the first antenna 101 and the second antenna 102 achieve antenna isolation sufficient for radio functionality in both the direction of the first polarization 103 and the direction of the second polarization 104, while maintaining a compact form.

Additionally, as a result of the arrangement of the device 100, the second antenna 102 achieves a high directional gain due to the first antenna 101 acting as a reflector. The first antenna 101 reflects energy radiated by the second antenna 102 into a primary radiation direction, which is away from the first antenna 101.

Figure 4A:
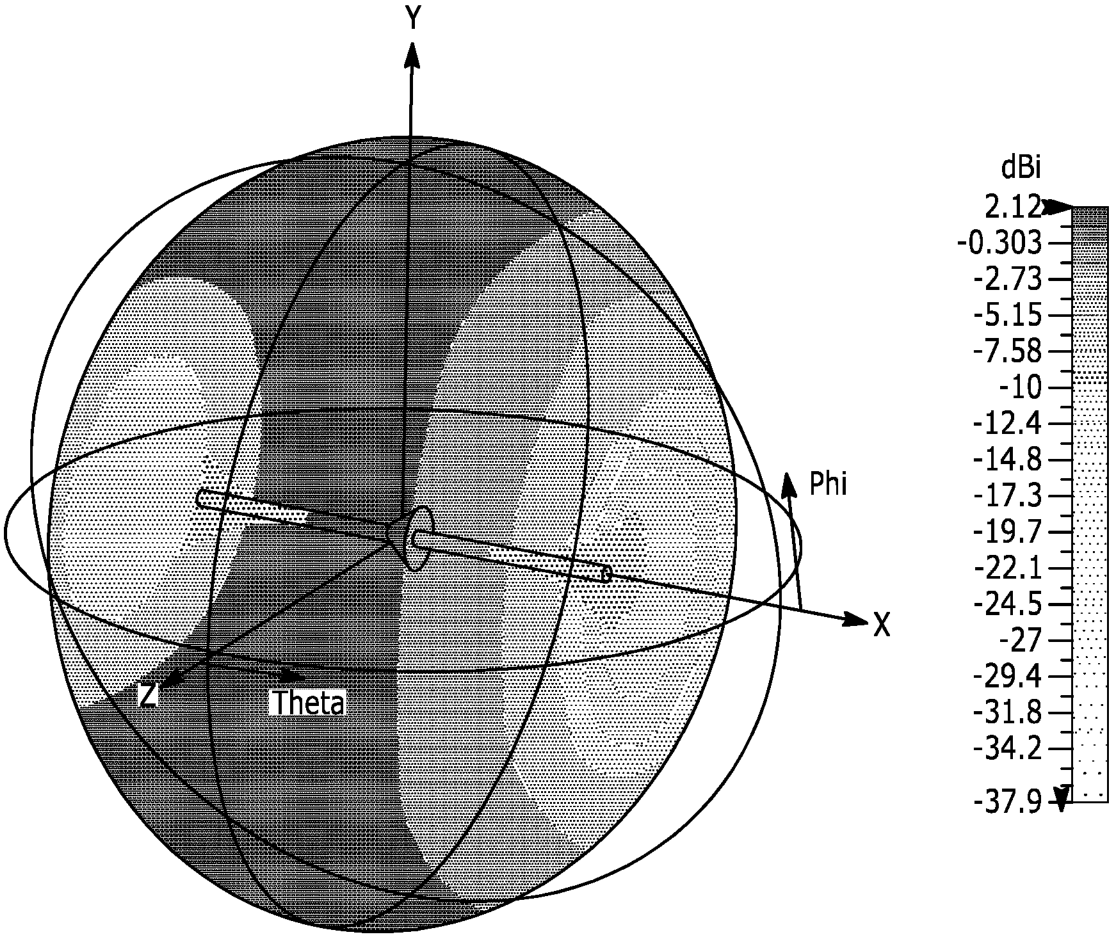
FIGS. 4*a*-4*c* are diagrams illustrating an example of the radiation pattern and omnidirectional gain of a dipole antenna from different perspectives.
Figure 4B:
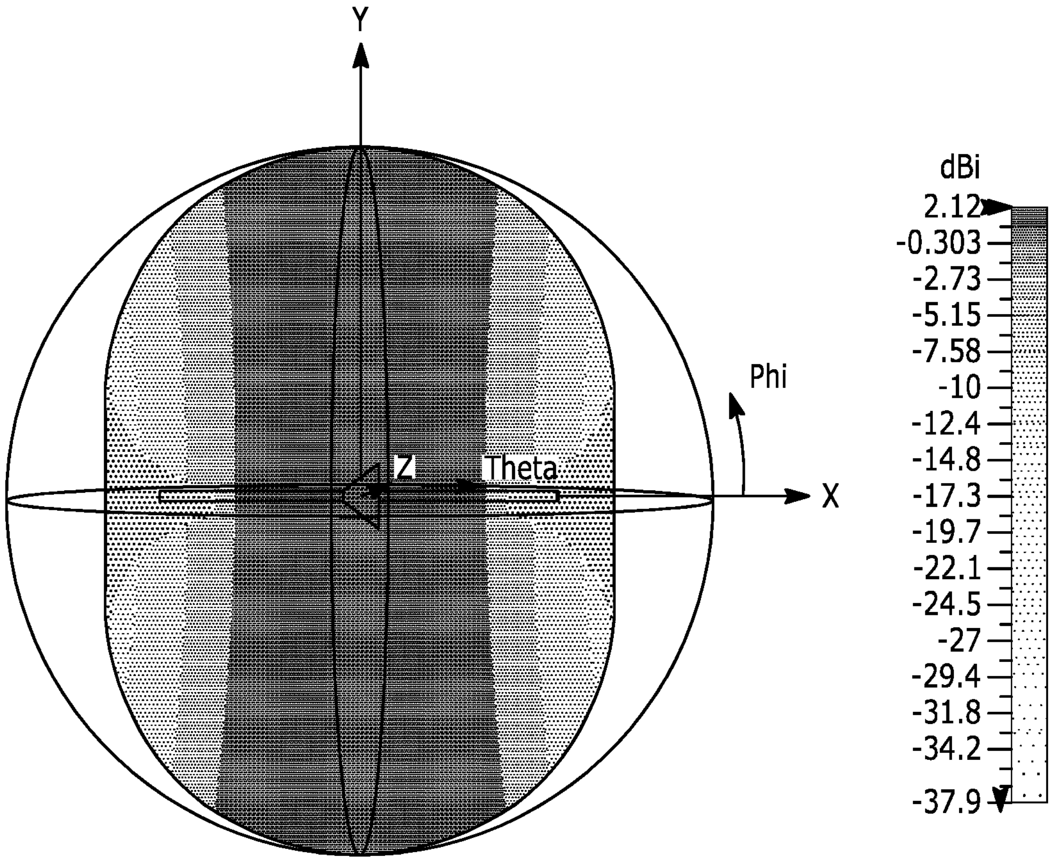
Figure 4C:
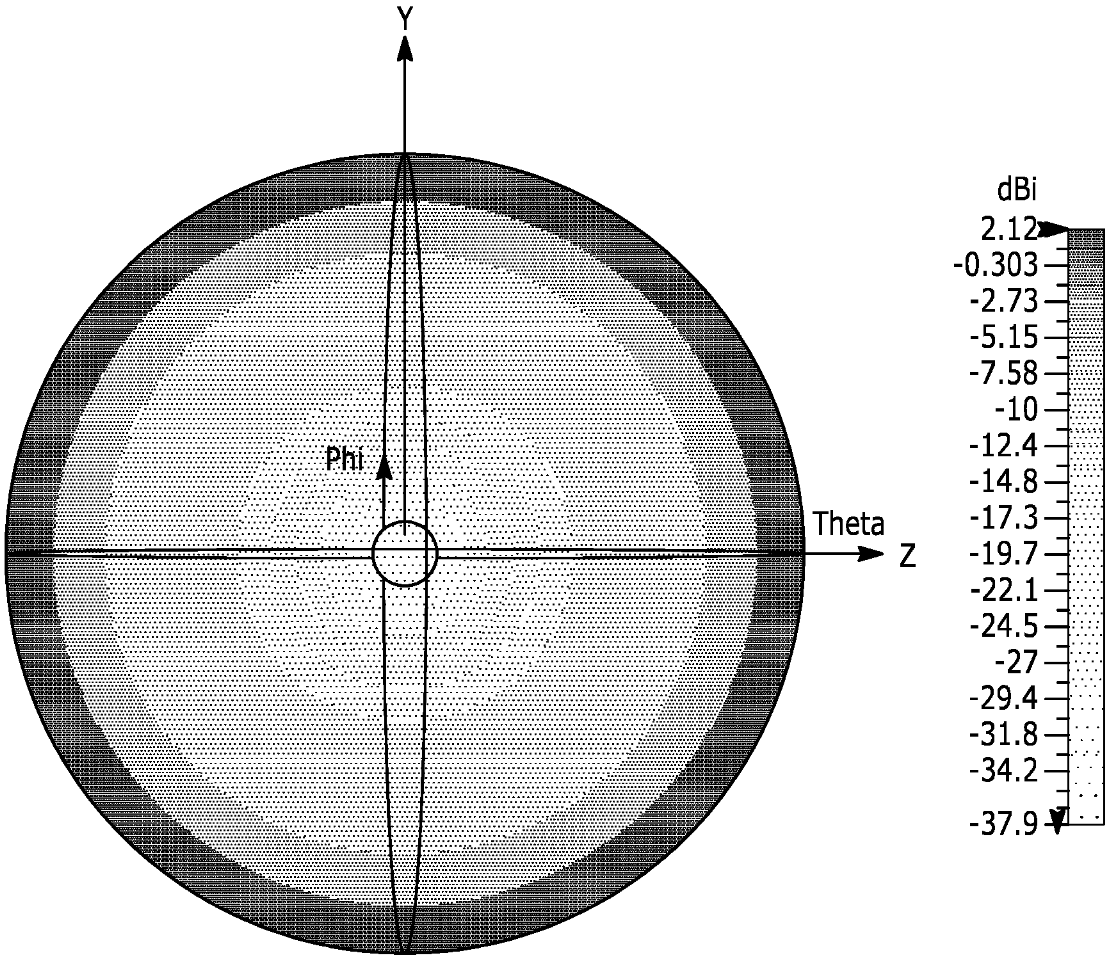

FIGS. 4*a*-4*c* illustrate the three-dimensional typical "donut-shaped" radiation pattern and gain of a dipole antenna 400 from various perspectives. Dipole antennas are known to have omnidirectional radiation patterns as illustrated in FIGS. 4*a*-4*c*. In embodiments of the present disclosure, the second antenna 102 is a dipole with characteristics similar to those illustrated in FIGS. 4*a*-4*c* if it were to operate without being positioned close to the first antenna 101 (and without additional interference). In each of FIGS. 4*a*-4*c*, the dipole antenna achieves a gain of 2.12 dBi.

Figure 5A:
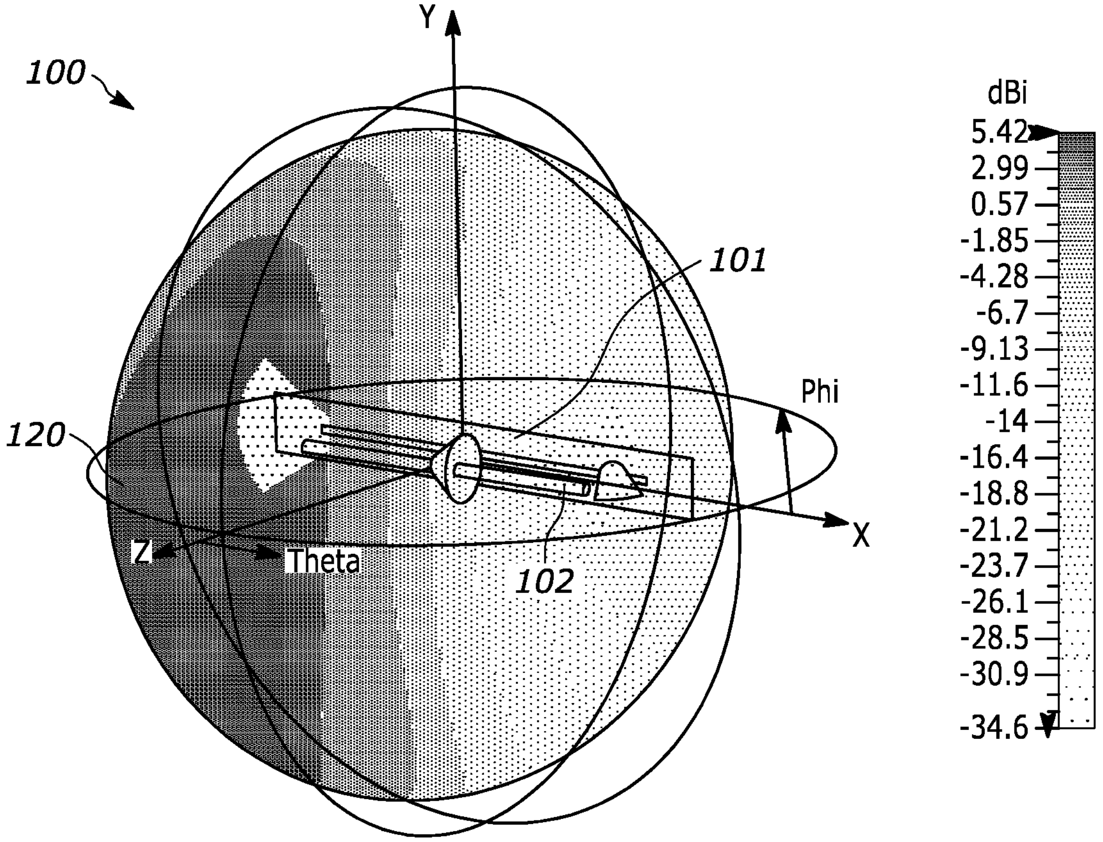
FIGS. 5*a* and 5*b* are diagrams illustrating an example of the radiation pattern and directional gain of a device of the present disclosure from different perspectives.
Figure 5B:
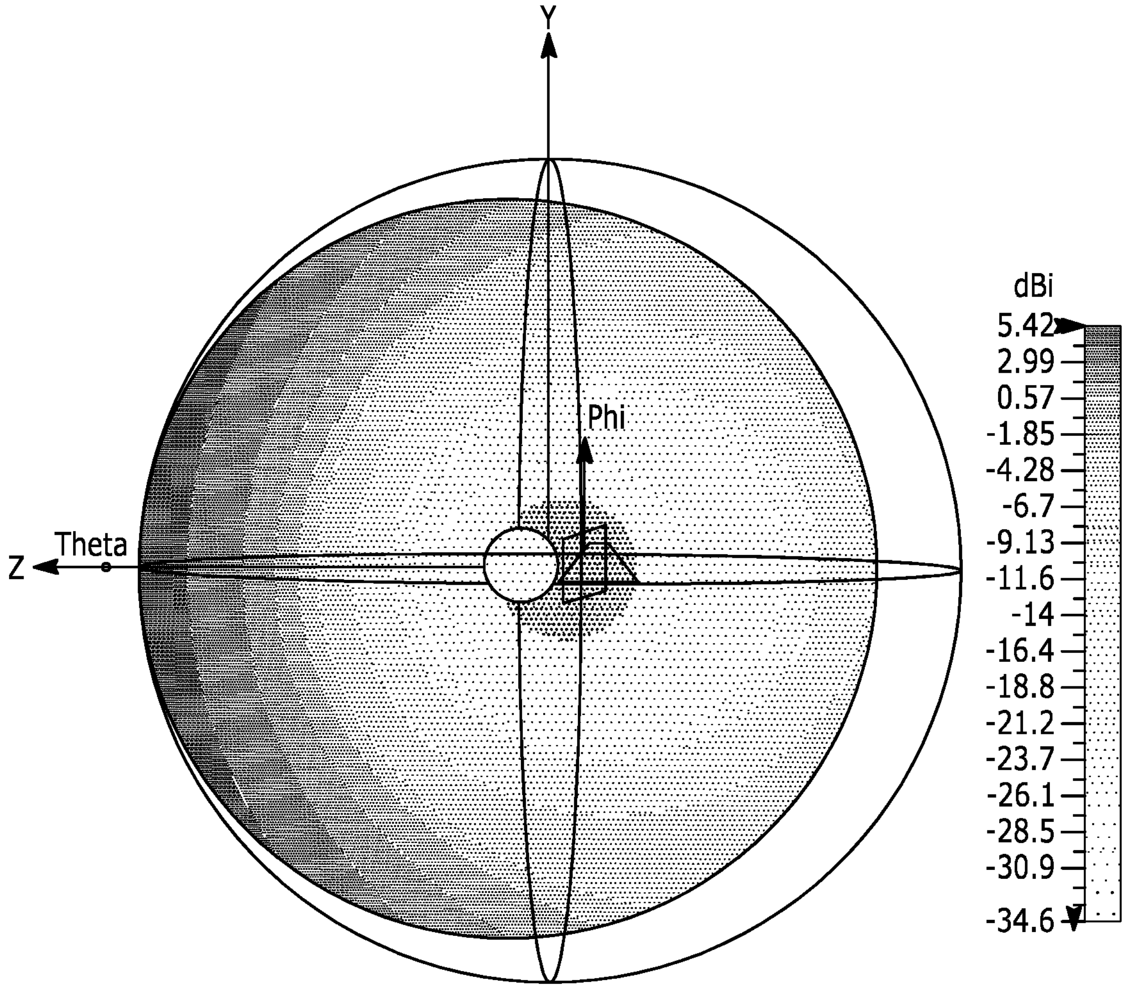

FIGS. 5*a* and 5*b* illustrate the three-dimensional radiation pattern and directional gain of the device of the present disclosure, when the second antenna is operating, and the first antenna 101 is acting as a reflector. The dark shading indicates areas of higher directional gain, in accordance with the scale on the right-hand side of the figure. The first antenna 101 reflects energy radiated by the second antenna 102 into a primary radiation direction, indicated by arrow 120. The device 100, with the second antenna 102 operating and the first antenna 101 functioning as a reflector, achieves a directional gain that is more than double the omnidirectional gain of the dipole antenna alone. In comparison to the antenna arrangements illustrated in FIGS. 4*a*-4*c*, the structure of the present disclosure illustrated in FIGS. 5*a* and 5*b* achieves higher directional gain.

Figure 6:
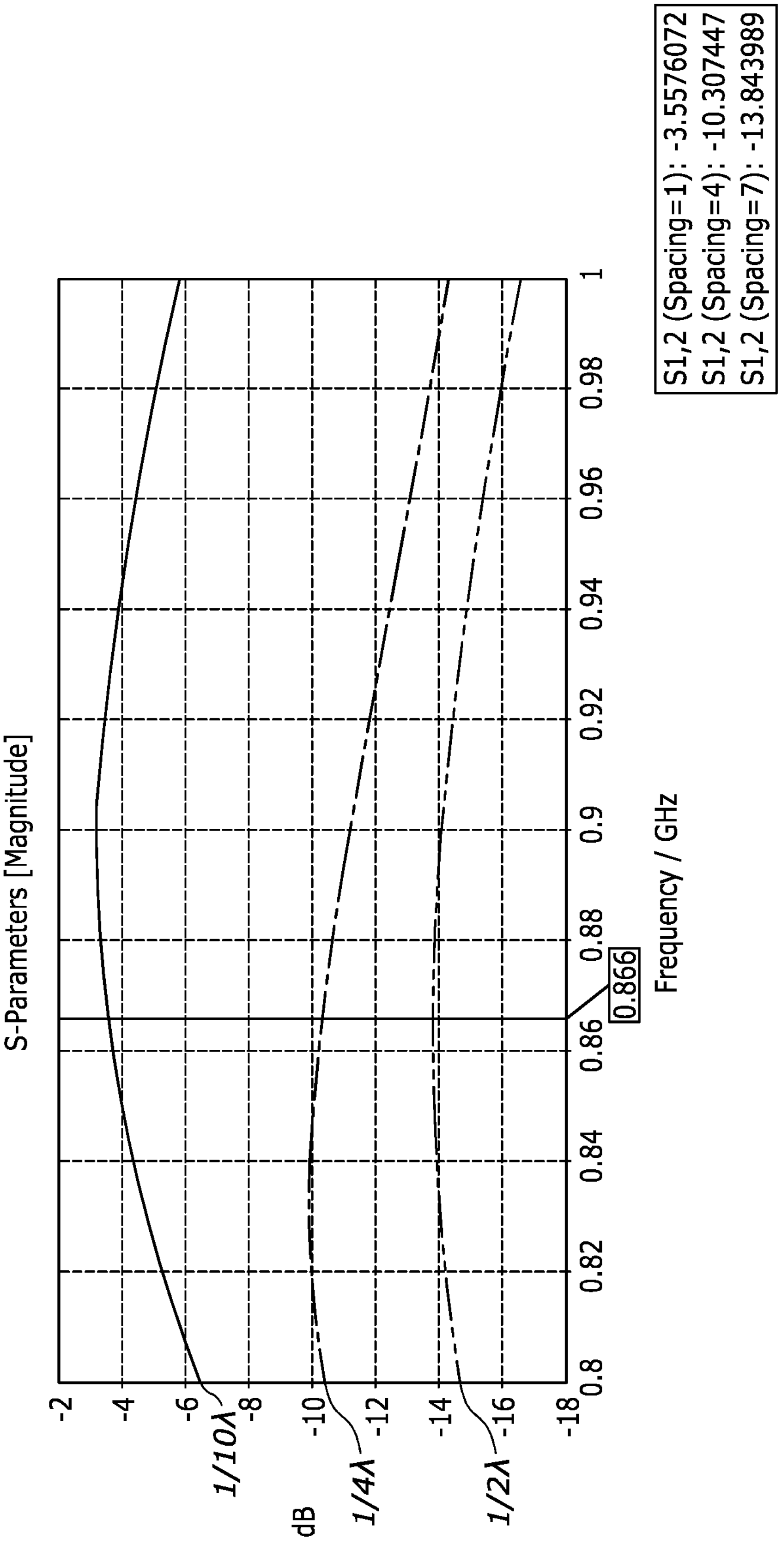
FIG. 6 is a graph illustrating the antenna isolation achieved by two dipole antennas where the antennas are spaced apart at various distances.

FIG. 6 illustrates comparative examples of the antenna isolation achieved by two closely coupled dipole antennas, wherein each antenna has horizontal polarization, and the antennas are parallel and coplanar; FIG. 6 illustrates the antenna isolation of these two dipoles with the spacing between the antennas relative to each other varied from one tenth of a wavelength to one quarter of a wavelength to one half of a wavelength. The antenna isolation achieved by the antennas, with each of the listed antenna spacing, is not acceptable performance for radio functionality. As FIG. 6 illustrates, when the two antennas are spaced at one tenth of a wavelength, performance is at its poorest, and while increasing the spacing to one half of a wavelength improves the antenna isolation, the performance is still unacceptable.

Figure 7:
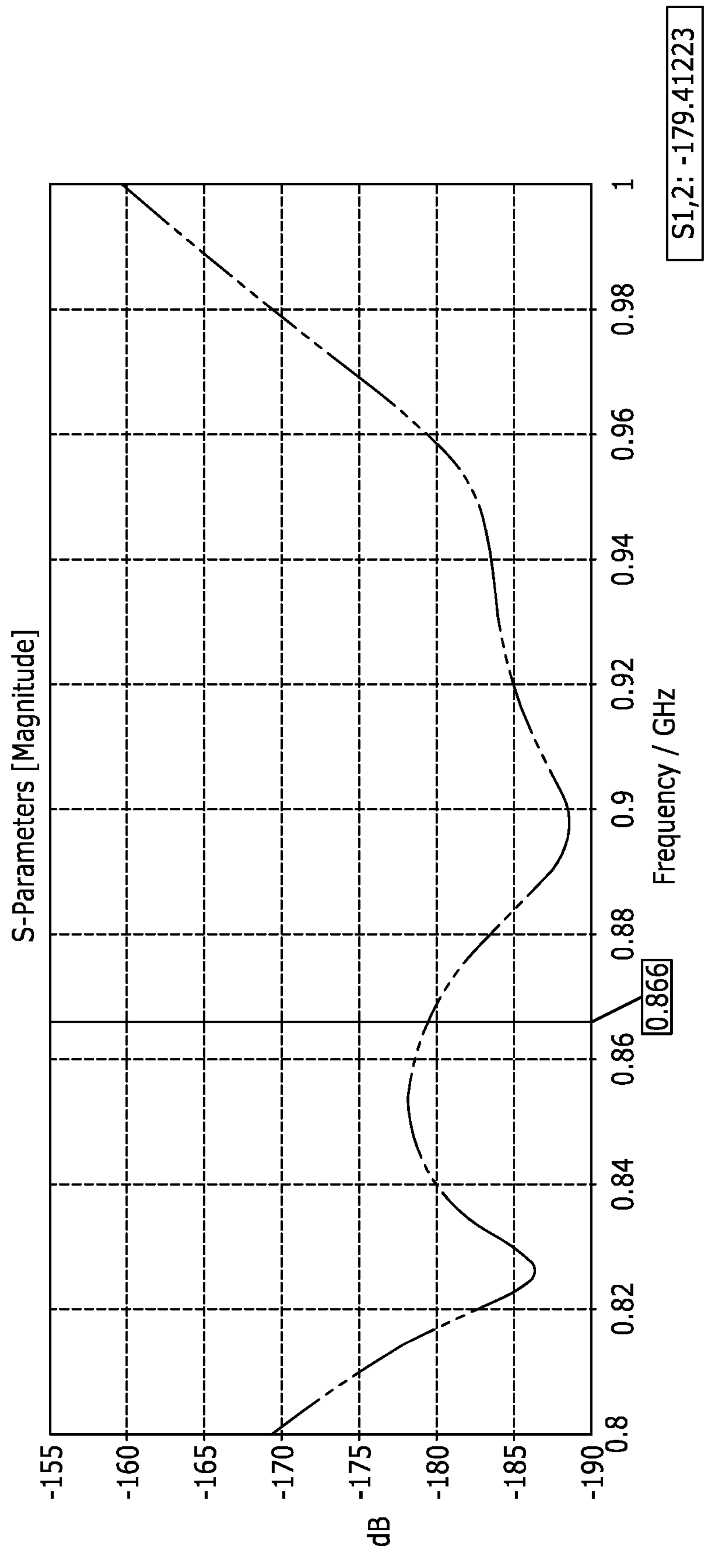
FIG. 7 is a graph illustrating the antenna isolation achieved by an example embodiment of the device of the present disclosure.

FIG. 7 illustrates an example of the antenna isolation achieved by the first antenna 101 and second antenna 102 in an example embodiment of the present disclosure, wherein the first antenna 101 is a slot antenna with a vertical first polarization 103 and the second antenna 102 is a dipole with a horizontal second polarization 104. In comparing FIGS. 6 and 7, the antenna isolation of the example embodiment of the present disclosure of FIG. 7 achieves an isolation (absolute value) of 179.4 dB, which is more than 160 db than that achieved by the multi-antenna assemblies illustrated in FIG. 6.

Although embodiments of the present invention provide for a number of positional and rotational modifications to the first antenna 101, the second antenna 102, or both, the advantages of this disclosure are evident when the first antenna 101 and the second antenna 102 are coplanar and parallel, the same length with the same end point locations in the direction of the first and second lengths, and the first frequency and the second frequency are the same frequency.

Modifications to any one or more of the frequency, length, position or rotation of two closely coupled antennas may improve the antenna isolation of the coupled antennas; however, the improvement to the antenna isolation is not as great as the improvement reached by embodiments of the present disclosure. Additionally, the improvement to the antenna isolation achieved by any of the above modifications results in a cost in physical design space, which is important in compact electronic devices.

The resultant device of embodiments of the present disclosure is one that physically accommodates two antennas operating at close frequencies into a single, compact device, achieves the antenna isolation required to have functionality in two polarizations, and achieves a high directional gain.

Figure 8:
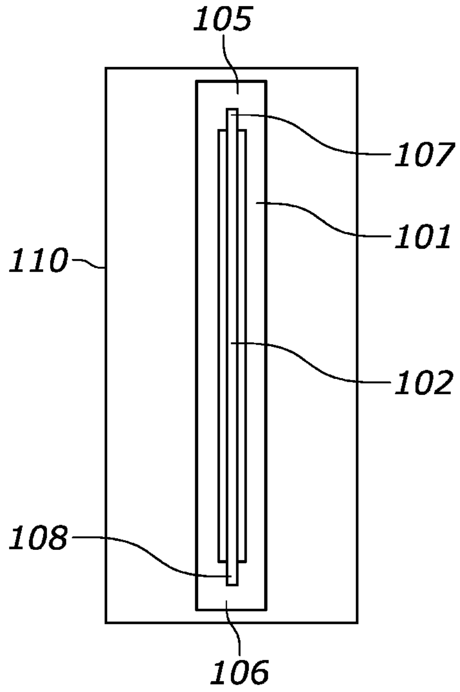
FIG. 8 is a diagram illustrating an example device of the present disclosure, wherein the device comprises a housing that encloses the first and second antenna.

FIG. 8 illustrates an embodiment of the present disclosure, wherein the device 100 further comprises a housing 110 that encloses the first antenna 101 and the second antenna 102. In another embodiment, a housing 130 encloses the first antenna 101 and the second antenna 102, but there is a gap such that antennas are not fully enclosed. The implementation of the housing 130 may take various forms such as a plastic casing, such as the plastic casing of a checkout scanner.

Figure 9A:
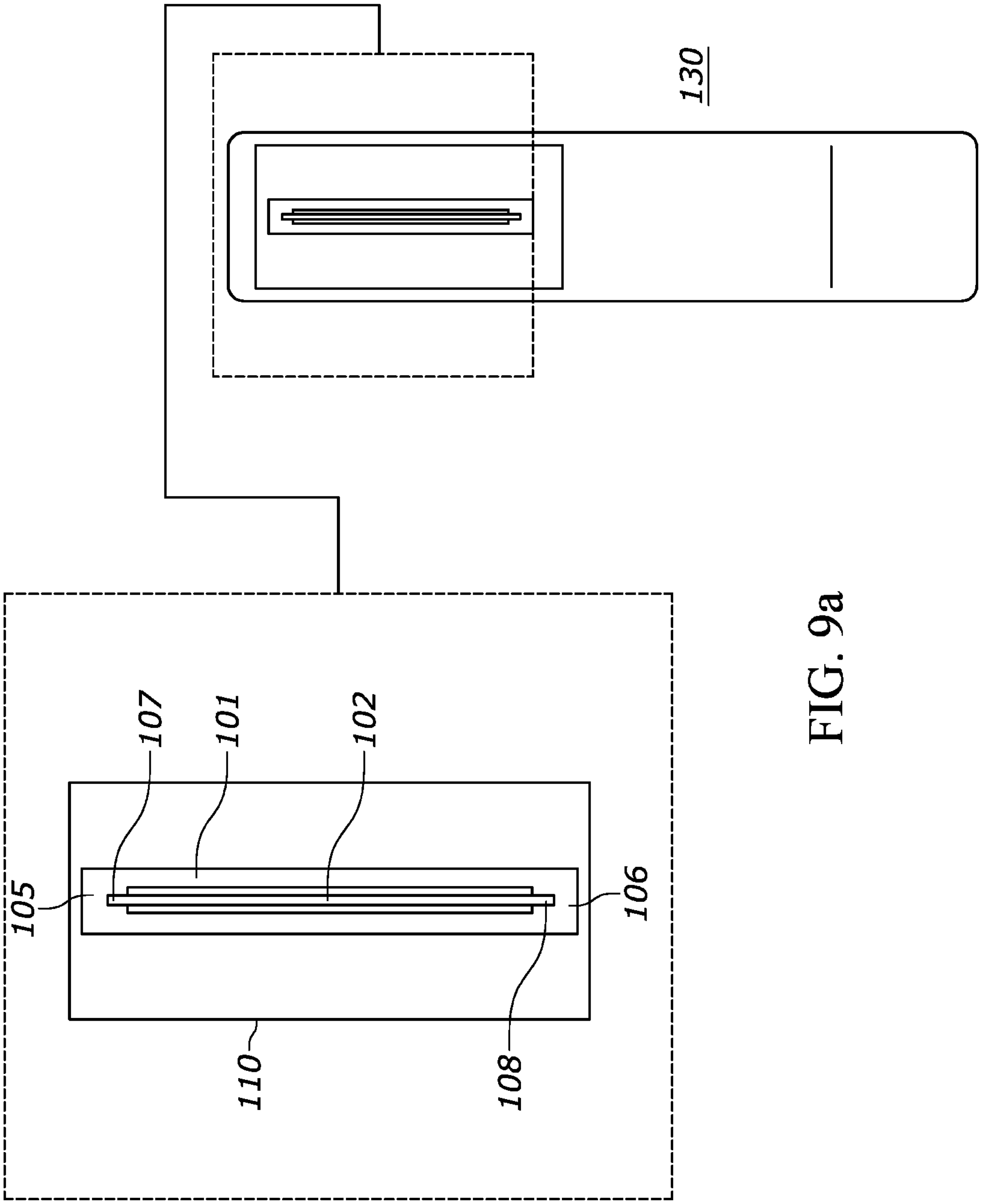
FIGS. 9*a* and 9*b* are diagrams illustrating an example embodiment of the device of the present disclosure that is implemented within a compact electronic device.
Figure 9B:
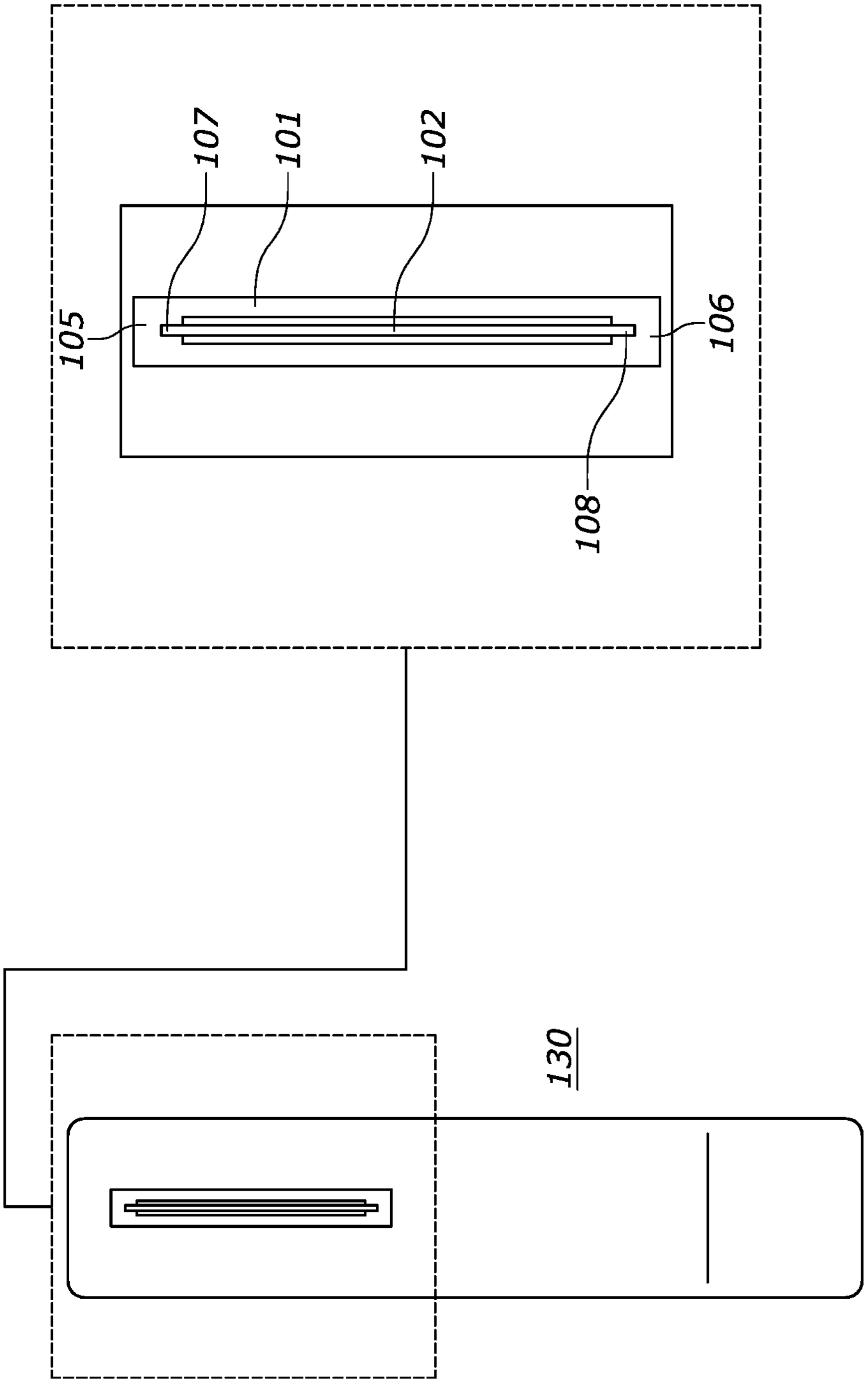

FIGS. **9*a* and 9*b* illustrate embodiments of the present disclosure, disposed within a compact electrical device 130, such as a handheld RFID reader. FIG. 9*a* illustrates an embodiment in which the device is enclosed within a housing 110 which is disposed within a compact electrical device 130. FIG. 9*b* illustrates an embodiment in which the device 100 is disposed within a compact electrical device 130**.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device comprising:

a first antenna, having a first polarization, operating at a first frequency, and located along a first length from a first end to a second end; and a second antenna, having a second polarization, operating at a second frequency, and located along a second length from a third end to a fourth end, wherein the first polarization is orthogonal to the second polarization, the first frequency of the first antenna and the second frequency of the second antenna are within the same frequency band, the first antenna and the second antenna are parallel and adjacent along the first length and the second length, the second antenna is outside a slot of the first antenna, and the first end and the third end are aligned with each other and the second end and the fourth end are aligned with each other along the first and second lengths.

2. The device of claim 1, further comprising a housing that encloses the first antenna and the second antenna.

3. The device of claim 1, wherein the first frequency and second frequency are within the Ultra High Frequency band.

4. The device of claim 1, wherein the first frequency and second frequency are within the range of 800 MHz to 1 GHz.

5. The device of claim 1, wherein the first length and second length are substantially coplanar.

6. The device of claim 1, wherein the first antenna is a slot antenna with a vertical first polarization and the second antenna is a dipole with a horizontal second polarization, and the first end and third end are within one tenth of a wavelength of each other and the second end and fourth end are within one tenth of a wavelength of each other, relative to either the first frequency or the second frequency.

7. The device of claim 1, wherein the first antenna is a slot antenna with a vertical first polarization and the second antenna is a dipole with a horizontal second polarization, and the first end and third end are within one quarter of a wavelength of each other and the second end and fourth end are within one quarter of a wavelength of each other, relative to either the first frequency or the second frequency.

8. The device of claim 1, wherein the first antenna and second antenna are askew within 5 degrees of each other along the first length and second length.

9. The device of claim 1, further comprising a primary radiation direction, wherein the primary radiation direction is away from the first antenna, and the second antenna is configured to radiate in the primary radiation direction, and the first antenna is configured to reflect energy radiated by the second antenna into the primary radiation direction.

* * * * *